(No Model.)
L. G. ADSIT.
COMBINED HORSE HOE AND SCRAPER.
No. 463,713. Patented Nov. 24, 1891.
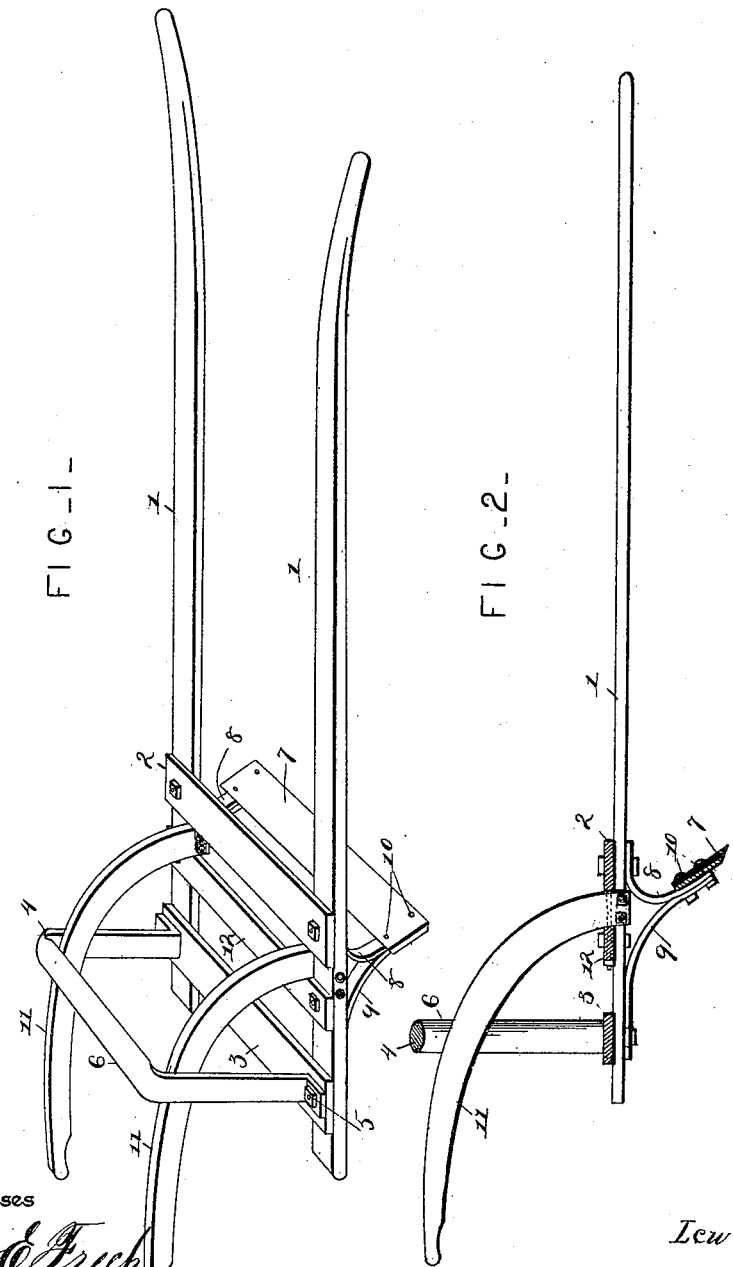
Witnesses
Geo. E. Frech
N. P. Riley
Inventor.
Lewis G. Adsit
By his Attorneys,
C. A. Snow & Co.

UNITED STATES PATENT OFFICE.

LEWIS G. ADSIT, OF CATSKILL, NEW YORK.

COMBINED HORSE HOE AND SCRAPER.

SPECIFICATION forming part of Letters Patent No. 463,713, dated November 24, 1891.

Application filed March 21, 1891. Serial No. 385,844. (No model.)

*To all whom it may concern:*

Be it known that I, LEWIS G. ADSIT, a citizen of the United States, residing at Catskill, in the county of Greene and State of New York, have invented a new and useful Combined Hoe and Snow-Crust Breaker, of which the following is a specification.

The invention relates to improvements in horse hoes and snow-crust breakers.

The object of the present invention is to provide a horse-hoe capable of readily removing the weeds of a garden and adapted to be employed to break the crust formed by snow and water on the surface of ice to enable the snow-crust to be readily removed by a scraper preparatory to cutting ice.

The invention consists of the construction and novel combination and arrangement of parts hereinafter fully described, illustrated in the accompanying drawings, and pointed out in the claim hereto appended.

In the drawings, Figure 1 is a perspective view of a horse hoe and snow-crust breaker constructed in accordance with this invention. Fig. 2 is a longitudinal sectional view.

Referring to the accompanying drawings, 1 designates a pair of shafts having their rear portions connected by parallel horizontal bars 2 and 3, which secure the shafts together and form with them the frame of the hoe, and the rear transverse bar 3 has secured to it a U-shaped handle 4. A hoe 7, which is set at an inclination, is secured to the lower faces of the shafts 1 by curved bars 8 and 9 and is designed to be employed in the usual manner to clean a garden of weeds, thistles, and the like, and the inclination at which the hoe-blade 7 is set causes the earth to readily fall over the rear upper edge. The curved bars 8 and 9 have their lower ends arranged together and secured to the rear face of the hoe-blade 7 near the ends thereof by bolts or rivets 10, and the said bars 8 and 9 diverge from the hoe and have their upper ends secured to the lower faces of the shafts.

The U-shaped handle 4 has its ends 5 extended laterally and secured by bolts to the upper face of the transverse bar 3 and is adapted to be employed when the device is used as a hoe; but when the device is used for breaking the crust on the surface of ice curved handles 11 are employed and have their lower front ends arranged contiguous to the rear edge of the transverse bar 2 and are secured by bolts or the like to a narrow transverse bar 12. The narrow transverse bar 12 is bolted to the upper face of the shafts and is arranged between the transverse bars 2 and 3 and is adapted to be readily removed when desired, and in constructing the hoe the curved handles 11 are first bolted to the narrow bar 12 and then arranged in proper position on the shafts. The handles 4 and 11 are removable and are adapted to be readily detached when the device is employed as a hoe or crust-breaker; but, if desired, the handles need not be removed.

From the foregoing description and the accompanying drawings the construction, operation, and advantages of the invention will be readily understood.

What I claim is—

In a horse hoe and crust-breaker, the combination of the shafts, the transverse bars 2 and 3, connecting the rear portions of the shafts, the hoe-blade 7, arranged at an inclination, the curved diverging bars 8 and 9, having their lower ends secured to the hoe-blade and their upper ends secured to the shafts, the U-shaped handle 4, having its ends attached to the transverse bar 3, the narrow bar 12, secured to the shafts and arranged between the transverse bars, and the curved handles secured to the narrow bar, substantially as described.

In testimony that I claim the foregoing as my own I have hereto affixed my signature in presence of two witnesses.

LEWIS G. ADSIT.

Witnesses:
JAMES B. OLNEY,
C. W. GARRISON.